(12) United States Patent
Ding et al.

(10) Patent No.: US 6,497,355 B1
(45) Date of Patent: Dec. 24, 2002

(54) SYSTEM FOR CONTROLLING THE STIRRING PIN OF A FRICTION STIR WELDING APPARATUS

(75) Inventors: R. Jeffrey Ding, Athens, AL (US); Peter L. Romine, Toney, AL (US); Peter A. Oelgoetz, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 6 days.

(21) Appl. No.: 09/690,035

(22) Filed: Oct. 13, 2000

Related U.S. Application Data
(60) Provisional application No. 60/159,258, filed on Oct. 13, 1999.

(51) Int. Cl.[7] ......................... B23K 20/12; B23K 13/08; B23K 31/12
(52) U.S. Cl. .............................. 228/2.1; 228/8; 228/102
(58) Field of Search .......................... 228/111.5, 112.1, 228/113, 114.5, 2.1, 2.3, 8, 102, 103, 9

(56) References Cited

U.S. PATENT DOCUMENTS

| | | | | |
|---|---|---|---|---|
| 3,998,373 A | * | 12/1976 | Jones et al. ................ 156/73.5 |
| 4,757,932 A | * | 7/1988 | Benn et al. ................ 228/102 |
| 4,811,887 A | * | 3/1989 | King et al. ................ 228/113 |
| 4,998,663 A | * | 3/1991 | Cakmak et al. ............. 156/378 |
| 5,558,265 A | * | 9/1996 | Fix, Jr. ........................ 228/2.1 |
| 5,697,544 A | * | 12/1997 | Wykes ........................ 156/580 |
| 5,713,507 A | * | 2/1998 | Holt et al. ............... 228/112.1 |
| 5,741,395 A | * | 4/1998 | Mozelack et al. ........ 156/304.2 |
| 5,858,142 A | * | 1/1999 | Tully et al. ................. 156/580 |
| 5,893,507 A | * | 4/1999 | Ding et al. ................. 156/580 |
| 6,050,475 A | * | 4/2000 | Kinton et al. ................ 144/142 |
| 6,145,730 A | * | 11/2000 | Wiesermann ............... 228/102 |
| 6,168,066 B1 | * | 1/2001 | Arbegast .................... 228/102 |
| 6,199,745 B1 | * | 3/2001 | Campbell et al. ......... 228/112.1 |
| 6,237,835 B1 | * | 5/2001 | Litwinski et al. ......... 228/112.1 |

\* cited by examiner

*Primary Examiner*—Tom Dunn
*Assistant Examiner*—Zidia Pittman
(74) *Attorney, Agent, or Firm*—James J. McGroary

(57) ABSTRACT

A control is provided for a friction stir welding apparatus comprising a pin tool which includes a shoulder and a rotating pin extending outwardly from the shoulder of the pin tool and which, in use, is plunged into a workpiece formed contacting workpiece members to stir weld the members together. The control system controls the penetration of the pin tool into the workpiece members which are mounted on a support anvil. The control system includes a pin length controller for controlling pin length relative to the shoulder and for producing a corresponding pin length signal. A pin force sensor senses the force being exerted on the pin during welding and produces a corresponding actual pin force signal. A probe controller controls a probe extending outwardly from the pin, senses a parameter related to the distance between the probe and the supporting anvil and produces a corresponding probe signal. A workpiece standoff sensor senses the standoff distance between the workpiece and the standoff sensor and produces a corresponding standoff signal. A control unit receives the various signals, together with a weld schedule, and, based on these signals and the weld schedule, controls the pin length controller so as to control pin penetration into the workpiece.

20 Claims, 4 Drawing Sheets

SYSTEM FOR CONTROLLING THE STIRRING PIN OF A FRICTION STIR WELDING APPARATUS

CROSS-REFERENCES TO RELATED APPLICATIONS

This application claims the benefit of U.S. Provisional Application No. 60/159,258 filed Oct. 13, 1999.

ORIGIN OF THE INVENTION

This invention was made by an employee and a contractor of the United States Government and may be manufactured and used by or for the Government for governmental purposes without the payment of any royalties thereon or thereof.

BACKGROUND OF THE INVENTION

1. Field of the Invention

The present invention relates to friction stir welding apparatus wherein a rotating pin tool is plunged into workpieces to create a weld, and, more particularly, to a penetration control system for the pin tool of such a friction stir welding, apparatus.

2. Background of the Invention

A friction stir weld machine is used to join two metal workpieces together. The two metal workpieces to be joined are positioned in a butt join configuration and clamped into this position. As indicated above, a friction stir weld is formed by plunging a rotating shouldered pin tool into the two closely fitting metal workpiece faces until the shoulder of the pin tool contacts the work surface. The initial pro be depth of the distal end of the pin of the pin tool is less than the required weld depth, and rotation of the pin within the workpiece provides frictional heating of the metal and produces a plasticized column of metal around the distal, probe end of the pin. The pin tool is moved in the direction of welding and, as this happens, the leading face of the probe end of the pin crushes the plasticized material and forces this material to the back of the pin. At the same time, the pin tool applies a substantial downwardly acting mechanical forging force. This force consolidates the weld metal into the weld joint at the trailing end of the tool.

Currently, pin tools for friction stir welding are of a fixed pin length. In commonly assigned U.S. Pat. No. 5,893,507 (Ding et al), the subject matter of which his hereby incorporated by reference, there is disclosed an automatically adjustable pin tool for friction stir welding wherein the pin tool automatically adjusts for welding materials of varying thicknesses and wherein the pin can be incrementally withdrawn from the workpiece to thereby eliminate any keyhole or crater in the weld.

In friction stir welding, it is important to control the plunge depth of the pin of the pin tool into the weld joint in order to produce the desired precision weld. This control is not possible with current systems. Mechanical systems wherein movement of the pin is controlled using a manual crank wheel do not provide sufficient control precision.

SUMMARY OF THE INVENTION

In accordance with the invention, a control system is provided for precisely controlling the depth or location of the distal end of the stirring pin of a rotating pin tool of a friction stir welding machine or apparatus so as to control the penetration of the pin into the workpiece.

According to the invention, there is provided, in a friction stir welding apparatus comprising a pin tool including a shoulder and a rotating pin extending outwardly from the shoulder of the pin tool, a control system for controlling penetration of the pin tool in a workpiece comprising contacting workpiece members which are to be joined by stir welding and which are mounted on a support anvil, the control system comprising: a pin length controller for controlling pin length relative to the shoulder and for producing a corresponding pin length signal; a pin force sensor for sensing the force being exerted on the pin during welding and for producing a corresponding actual pin force signal; a sensor for sensing a parameter related to the position of the shoulder of the pin tool; and for generating a shoulder position signal based thereon; and a control unit for receiving said pin length signal, said pin force signal, and said shoulder position signal, and for, based on said signals, controlling the pin length controller so as to control pin penetration ,into the workpiece.

The apparatus preferably further comprises a workpiece standoff sensor for sensing the standoff distance between the workpiece and the standoff sensor and for supplying a corresponding standoff signal to said control unit.

Advantageously, the control unit further receives a signal related to a weld schedule for the welding apparatus and further controls the pin length controller based thereon.

Preferably, the apparatus further comprises a probe controller for controlling a probe extending outwardly from said pin, for sensing a probe parameter related to the distance between the probe and the supporting anvil and for supplying a corresponding probe signal to said control unit. Advantageously, the probe parameter comprises probe force. Alternatively, or in addition, the probe parameter comprises probe position.

In a preferred embodiment, the shoulder position parameter comprises shoulder force. Alternatively, or in addition, the parameter comprises depth of shoulder penetration.

Preferably, the apparatus further comprises an actuator for moving the pin relative to the shoulder and the system further comprises a linear encoder for sensing the actual length of the pin, and the pin controller determines the difference between the actual pin length and a desired pin length and controls pin position based on this difference.

Advantageously, the control system further comprises a motion controller for controlling driving of the actuator, and the actuator includes an incremental encoder for supplying an actual velocity signal to the motion controller, the motion controller further receiving the pin length signal from the linear encoder.

The apparatus typically includes adjustable pin tool gearing driven by the actuator for determining the pin length and, preferably, the control system further comprises limit switches associated with the pin tool gearing for supplying limit signals to the motion controller.

Further features and advantages of the present invention will be set forth in, or apparent from, the detailed description of preferred embodiments thereof which follows.

DESCRIPTION OF THE PREFERRED EMBODIMENTS

Figure 1:
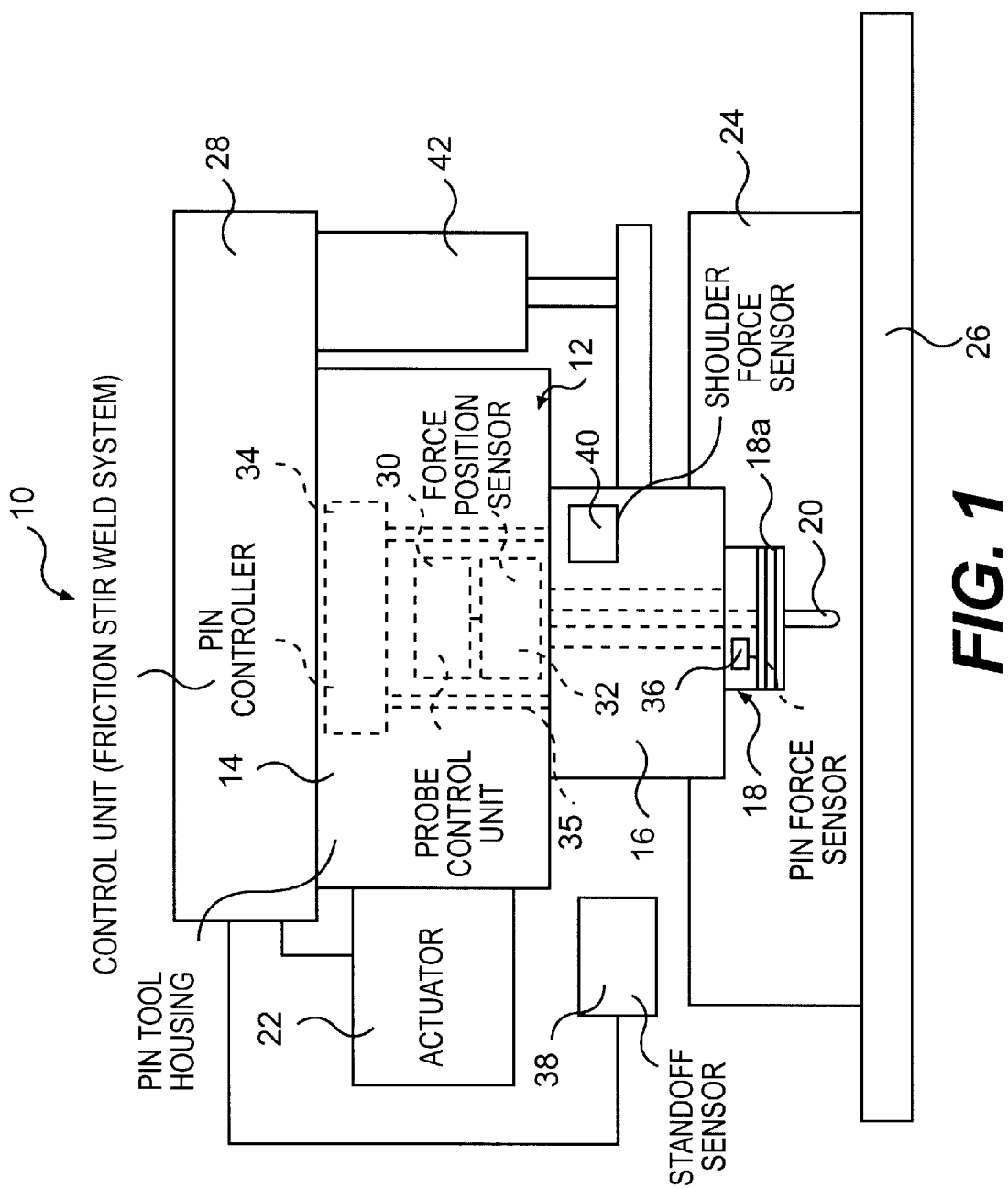
FIG. 1 is a highly schematic front elevational view, partially in section, of a friction stir welding apparatus incorporating a control system in accordance with a preferred embodiment of the invention.

Referring to FIG. 1, there is shown, in a highly schematic manner, a friction stir welding apparatus or system indicated generally at 10. The system 10 includes a pin tool 12 including a main housing 14, a shoulder 16, a stirring pin 18, and a probe 20. The pin tool 12 is a retractable pin tool of the type described in U.S. Pat. No. 5,893,507 (Ding et al). Reference is made to this patent for a more complete description of the pin tool itself. An actuator 22 controls extension pin 18 so that the threaded distal end thereof, denoted 18a, enters into, and mechanically stirs, two contacting workpiece members. Only one of the workpiece members, denoted 24, is shown and for purposes of ease of description the workpiece formed by the workpiece members will be referred to as workpiece 24. As pin 18 enters workpiece 24 the shoulder 16 contacts and ultimately extends into the workpiece faces. As indicated above, friction stir welding is used to join two contacting workpieces together and, as the friction generated causes the metals to become plasticized and pressure is simultaneously applied, the pin 16 sinks or plunges into the metals. The rotating pin 16 is moved along the junction between the metals and the weld created thereby joins the metals. The workpieces indicated at 24 are supported by an anvil 26.

The friction stir weld system 10 includes an overall control unit indicated by block 28. The control unit 28 receives signals from a probe controller or control unit 30, a probe force sensor 32, a pin force sensor 36 (which can be located on the pin 18 and comprise a strain gauge, a piezoelectric force sensor or the like), a pin controller 34, a standoff sensor 38, a shoulder position controller (weld machine weldhead positioner) which is part of control unit 28, a shoulder force sensor 40, and a linear encoder 42. The welding machine controller unit 28 controls the operation of the friction stir welding system 10 based on these signals. It will be understood that the showing in FIG. 1 is highly schematic and that, further, probe controller 30, probe sensor 32 and the pin controller 34, among other units, can be part of the control unit 28.

Considering the elements of the basic system in more detail, the probe 20 is a solid rigid shaft which extends centrally through a bore in the pin tool, the shoulder 16 and the pin 18, and which is moveable longitudinally. The probe controller or control unit 30 controls the movement of the probe 20. The probe 20 is moved between a position wherein the probe 20 is retracted into the pin 18 and multiple positions wherein the probe 20 extends various distances beyond the distal threaded end 18a of pin 18. The probe 20 will obviously be subjected to forces acting thereon when moved out of the pin 18 into the workpieces 24. These forces are sensed by the force/position sensor 32 which is used both to sense the position of the probe 20 and to sense the force exerted thereon. Corresponding signals are supplied to control unit 28 as is discussed in more detail below.

As is generally indicated in FIG. 1, workpiece 24 is mounted on, and fits tightly against, the back-up anvil 26. Before the pin 18 plunges into, i.e., is caused to enter into, the weld joint, a reference or home position for the distal end or tip of the probe 20 is calibrated. Advantageously, the home position of the probe 20 is defined in space as being flush with the external, distal end surface of the pin 18 which surrounds the probe 20. When the weld is initiated, the pin 18 and probe 20 are moved together, at the same rate of speed, and thus the tip of the pin 18 and the probe 20 plunge together into the workpieces or weldpieces 24. Sensor 32 senses the actual extended length of the probe 20 and enables the tip of probe 20 and thus the pin 18 to be located very close to the back side of the workpiece 24 and thus very close to the back-up anvil 26. With the probe 20 so positioned, the tip of the probe 20 is then extended through the very small distance which seperates the tip from the anvil 26 so as to "tap" against the anvil 26. Once in contact with the anvil 26, the tip of the probe 20 is subjected to a force which is transmitted through the probe 20 to the probe force sensor 32. The probe force sensor 32 can comprise any conventional force sensor and preferably includes an associated readout device (not shown) so that a spike in the force reading indicates that contact has been made with the anvil 26 and thus that the probe 20 has been extended to the backside of the workpieces 24.

The pin 18 is subjected to forces acting thereon during the positioning and welding operation. These forces are sensed by the pin force sensor 36 which supplies corresponding signals to control unit 28 which are also used in controlling pin positioning. Once the pin 18 is positioned, the tip of probe 20 is retracted into the pin 18 to the home position thereof during the welding operation. Periodically, during welding, the probe 20 is extended so as to again "tap" against the anvil 26, thereby verifying that the pin 18 is at the requested position, i.e., depth.

It will be appreciated that the drawings are not to scale and that, in fact, the probe 20 is very small so that its presence will not have any significant impact on the weld while performing its function. In this regard, the tip is normally retracted so as to be flush with pin 18 during welding and because the pin 18 is very large relative to the probe 20, the action of the larger rotating pin 18 will mask any detrimental effects resulting from the presence of the probe 20.

The connection between control unit 28 and the controller of the actuator 22 enables the former to signal to the latter that the probe 20 has been retracted and welding can be begun. Although other implementations can be employed, probe control unit 30 can include a small motor and associated encoder for extending and retracting probe 20 and for determining the relative position thereof. This movement is, of course, independent of that of pin tool 12 although, as noted above, initially pin 18 and probe 20 are plunged together into the weld pieces 24.

Figure 2:
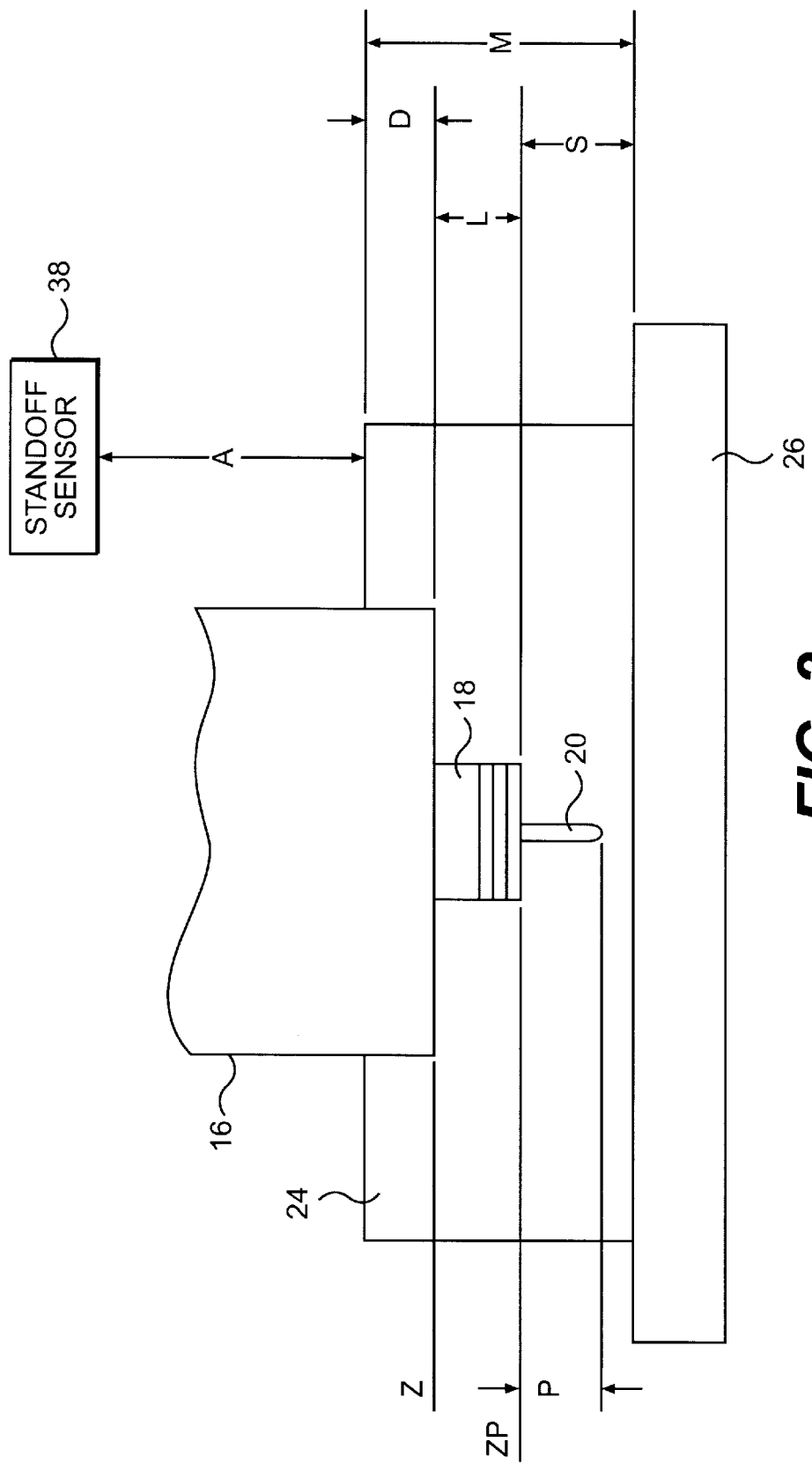
FIG. 2 is a diagram showing a portion of the apparatus of FIG. 1 and is used in explanation of the operating parameters of the control system.

Referring to FIG. 2, certain parameters are defined relative to the pin tool 16, pin 18, probe 20, workpieces 24, anvil 26, and standoff sensor 38. These parameters are as follows: pin length L, shoulder position Z (i.e., the position of the shoulder of pin tool 10, as explained below), pin standoff S, shoulder depth D, material thickness M, standoff A and probe or detector rod length P, during welding. The material thickness of the weld article is the thickness of the material comprising the workpieces 24 to be welded and, as indicated above, the anvil 26 supports the weld article (workpieces) 24 and opposes the welding force. The shoulder of pintool 16 rotates against the weld article 24 during the welding as described above and, as welding proceeds, may enter into the workpieces 24, as shown. The pin 18 extends beyond the shoulder of pin tool 16 to penetrate workpieces 24 during welding while, as set forth hereinabove, the probe 20 can be extended and retracted back into the pin 18 during welding to monitor the position of the pin 18 relative to the anvil 26 through force and/or position sensing.

Considering the parameters defined in FIG. 2, the pin length L is the distance between the end of the shoulder of pin tool 16 nearest the anvil 26 and the end of the pin 18 nearest the anvil 26. The shoulder position Z is the position of the shoulder of the pin tool 16 in the coordinate system of the welding machine. The pin standoff S is the distance between the end of the pin 18 nearest the anvil 26 and the anvil 26 itself. For full penetration welding, the pin standoff S should be substantially zero. The shoulder depth D is the distance that the shoulder of pin tool 16 has penetrated into the workpieces or weld article 24. The probe length P is the distance the probe 20 has been extended out of the pin 18. As indicated above, the material thickness M is the thickness of the weld article 24 at the current position of welding. The standoff A is the distance from the standoff sensor 38 to the top surface of the workpieces or weld article 24.

Figure 3:
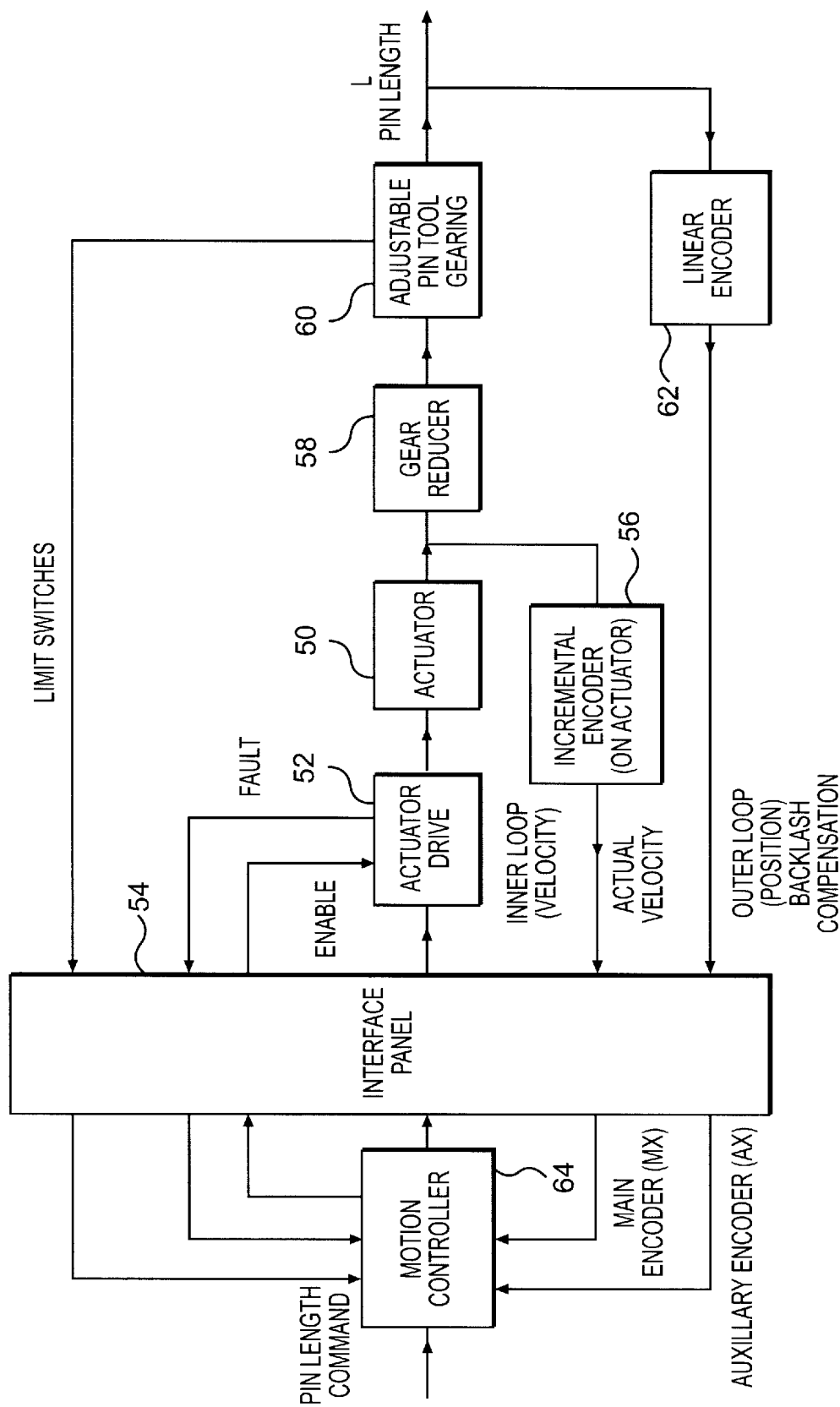
FIG. 3 is a flow diagram of the pin length controller system.

Referring to FIG. 3, which is a flow diagram for the pin length controller, the actuator (corresponding to actuator 22 of FIG. 1) and the actuator drive therefor are indicated at 50 and 52, respectively. Control is effected by an interface panel 54 (generally corresponding to control unit 28 or a part thereof) which provides enable signals to, and receives fault signals from, actuator drive 52. An incremental encoder 56, which is disposed on actuator 50, senses actuator velocity and provides an actual velocity signal to panel 54.

A gear reducer 58 is connected between actuator 50 and adjustable pin tool gearing unit 60 which controls the pin length L. As indicated, limit switches associated with gearing 60 indicate when the gearing has reached its limit of travel.

A linear encoder 62 provides position information to interface panel 54 and forms an outer loop that provides backlash compensation.

A motion controller 64 (which forms part of control unit 28 of FIG. 1) receives the weld schedule, as well as other inputs as shown, in controlling actuator 60 through control signals produced by interface panel 54. The motion controller 64 monitors these sensory inputs and uses a PID (proportional integral derivative) algorithm or feedback control which processes the output signal from the pin force sensor 36 to command the drive for actuator 22 so as to move the pin 18 to its desired position.

Figure 4:
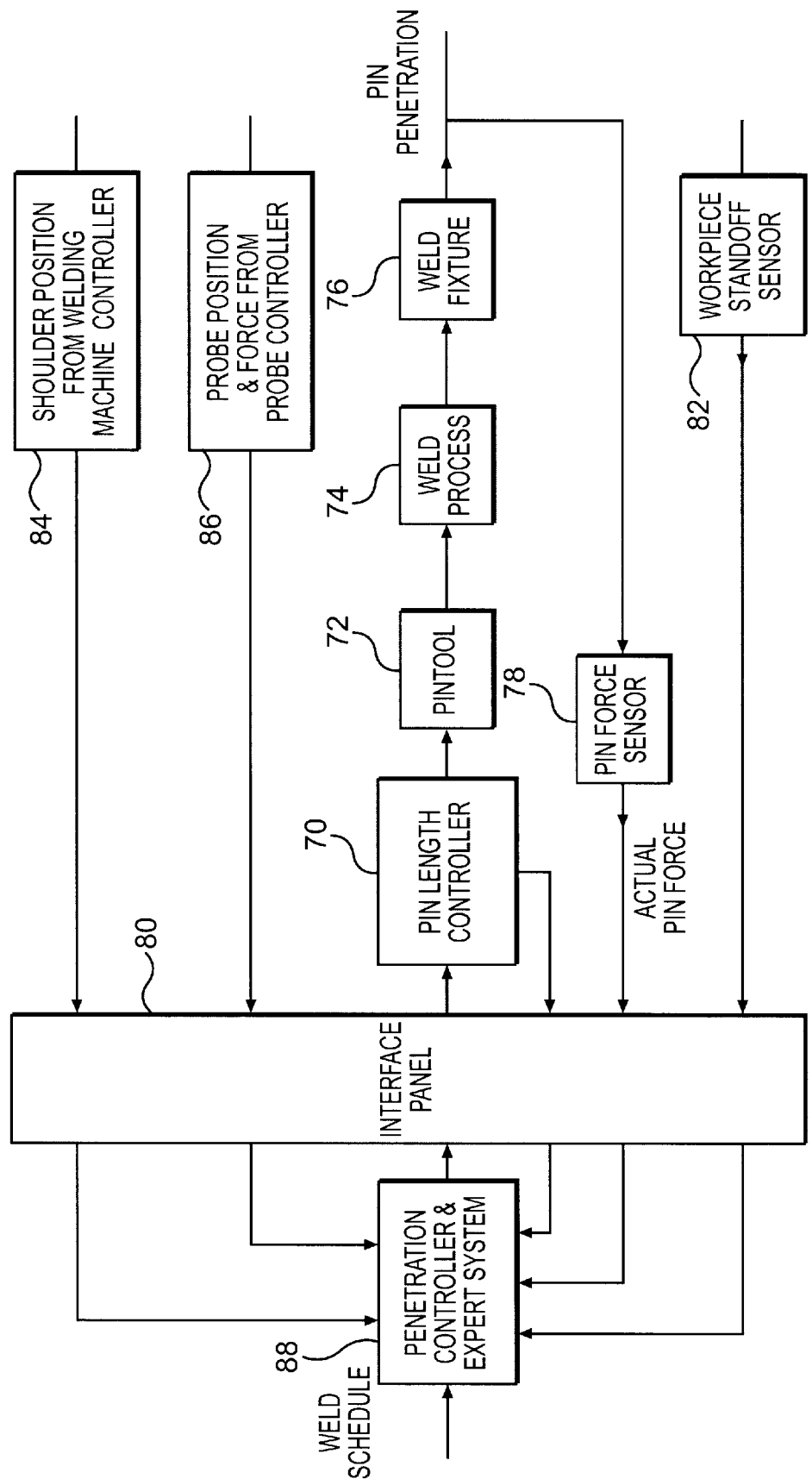
FIG. 4 is a flow diagram of the overall pin penetration control system.

Referring to FIG. 4, which is a flow diagram of the penetration controller portion of the control system, a pin length controller 70 controls the position of the pintool 72 in a weld process indicated at 74 for welding workpieces (corresponding workpieces 24), supported in a weld fixture 76 (corresponding to anvil 26), as described above. A pin force sensor 78 (corresponding to sensor 36) senses the force exerted on the pin during the weld process 74 and supplies a corresponding actual pin force signal to an interface panel 80. Panel 80 also receives an input signal from pin length controller 70.

A workpiece standoff sensor 82 (corresponding to standoff sensor 38 of FIG. 1) also supplies a signal to panel 80. A shoulder position signal 84 from the welding machine controller, and signals 80 related probe position and force from the probe controller are also supplied to interface panel 80. Alternatively, or in addition, a shoulder force signal can be employed which would be derived form a force sensor (not shown), in the form of load cell, strain gauge or the like, located in axial alignment with the shoulder of pin tool 16. Such a shoulder force sensor would measure shoulder force independent of pin force.

The weld schedule is also input to a penetration controller and expert unit or system 88 which, in addition, receives the various signals described above and produces an input signal to interface panel 80 used to control the pin length controller 70 and thus to control pin penetration. Thus, in general, the penetration and expert system controller 88 monitors sensor inputs from the pin length controller 70, the pin force sensor 78, the workpiece standoff sensor 82, the shoulder position sensor 84 and the probe position and force sensor 86 and adaptively commands the pin length controller 70 to change the pin length based on the weld schedule and the current and past states of the system.

As indicated above, the penetration controller and expert system 88 is provided with an external weld schedule to follow throughout a welding operation. The weld schedule provides the desired pin standoff S and the shoulder depth D and/or the shoulder force for the weld. The penetration controller and expert system 88 monitors the various sensory inputs discussed above and adaptively commands the pin length controller as just described. The welding operation begins with the external weld schedule identifying the desired pin standoff S and pin tool depth D and/or pin tool force for the weld. The penetration controller and expert system 88 processes these, two signals and as welding commences, the input signal to the penetration controller and expert system 88 corresponds to the desired pin standoff S. The difference between the desired and actual pin position is the pin error. The corresponding error signal is processed within the pin length controller 70 where the two signals are continuously compared. The penetration controller and expert system 80 uses the standoff sensor 82 (corresponding to sensor 38 of FIG. 1) to determine the distance of the top of the workpiece 24. The shoulder depth D is calculated using the equation D=Z-T, where, referring to FIG. 1, T is the deflection of the workpiece 24 away from the pin tool 16 as the pin tool 16 presses against the workpiece, and the pin standoff is given by the equation S=M-L-D. The maximum deflection T occurs during plunge as the pin 18 is penetrating into the workpiece. The force (and deflection) decreases when the rotating shoulder of pintool 16 comes into contact with the workpiece 24, the shoulder thereby creating heat and softening the workpiece. When the pin standoff S deviates from the desired value, the penetration controller and expert system 88 adjusts the pin position accordingly to maintain desired standoff. The standoff sensor 82 corrects for movement as the weld article 24 moves away from the initial fixture position.

Although the invention has been described above in relation to preferred embodiments thereof, it will be understood by those skilled in the art that variations and modifications can be effected in these preferred embodiments without departing from the scope and spirit of the invention.

What is claimed is:

1. In a friction stir welding apparatus comprising a pin tool including a shoulder and a rotating pin extending outwardly from the shoulder of the pin tool, a control system for controlling penetration of the pin tool into a workpiece comprising contacting workpiece members which are to be joined by stir welding and which are mounted on a support anvil, said control system comprising a closed loop system including:

a pin length controller for controlling pin length relative to the shoulder and for producing a corresponding pin length signal;

a pin force sensor for sensing the force being exerted on the pin during welding and for producing a corresponding actual pin force signal;

a sensor for sensing a parameter related to the position of the shoulder of the pin tool, and for generating a shoulder position signal based thereon; and a control unit for receiving said pin length signal, said pin force signal, and said shoulder position signal, and for, based on said signals, controlling the pin length controller so as to control pin penetration into the workpiece relative to the anvil.

2. An apparatus according to claim 1 wherein said apparatus further comprises a workpiece standoff sensor for sensing the standoff distance between the workpiece and the standoff sensor and for supplying a corresponding standoff signal to said control unit.

3. An apparatus according to claim 1 wherein said control unit further receives a signal related to a weld schedule for the welding apparatus and further controls the pin length controller based thereon.

4. An apparatus according to claim 1 wherein said apparatus further comprises a probe controller for controlling a probe extending outwardly from said pin, for sensing a probe parameter related to the distance between the probe and the supporting anvil and for supplying a corresponding probe signal to said control unit.

5. An apparatus according to claim 4 wherein said probe parameter comprises probe force.

6. An apparatus according to claim 5 wherein said probe parameter comprises probe position.

7. An apparatus according to claim 4 wherein said probe parameter comprises probe position.

8. An apparatus according to claim 1 wherein said parameter comprises shoulder force.

9. An apparatus according to claim 3 wherein said parameter comprise's depth of shoulder penetration.

10. An apparatus according to claim 1 wherein said apparatus further comprises an actuator for moving the pin relative to the shoulder and the control system further comprises a linear encoder for sensing the actual length of the pin, and wherein said pin controller determines the difference between the actual pin length and a desired pin length and controls pin position based on said difference.

11. An apparatus according to claim 1 wherein said control system further comprises a motion controller for controlling driving of said actuator, and said actuator includes an incremental encoder for supplying an actual velocity signal to said motion controller, said motion controller further receiving said pin length signal from said incremental encoder.

12. An apparatus according to claim 1 wherein said apparatus includes adjustable pin tool gearing driven by said actuator for determining the pin length and said control system further comprises limit switches associated with said pin tool gearing for supplying limit signals to said motion controller.

13. In a friction stir welding apparatus comprising a pin tool including a shoulder and a rotating pin extending outwardly from the shoulder of the pin tool, a control system for controlling penetration of the pin tool in a workpiece comprising contacting workpiece members which are to be joined by stir welding and which are mounted on a support anvil, said control system comprising a closed loop system including:

a pin length controller for controlling pin length relative to the shoulder and for producing a corresponding pin length signal;

a pin force sensor for sensing the force being exerted on the pin during welding and for producing a corresponding actual pin force signal;

a force sensor for sensing the force being exerted by the position of the shoulder of the pin tool, and for generating a corresponding actual shoulder force signal based thereon; and a control unit for receiving said pin length signal, said pin force signal, and said shoulder force signal, and for, based on said signals, controlling the pin length controller so as to control pin penetration into the workpiece relative to the anvil.

14. An apparatus according to claim 13 wherein said apparatus further comprises a workpiece standoff sensor for sensing the standoff distance between the workpiece and the standoff sensor and for supplying a corresponding standoff signal to said control unit.

15. An apparatus according to claim 13 wherein said control unit further receives a signal related to a weld schedule for the welding apparatus and further controls the pin length controller based thereon.

16. An apparatus according to claim 13 wherein said apparatus further comprises a probe controller for controlling a probe extending outwardly from said pin, for sensing a probe parameter related to the distance between the probe and the supporting anvil and for supplying a corresponding probe signal to said control unit.

17. An apparatus according to claim 16 wherein said probe parameter comprises probe force.

18. An apparatus according to claim 16 wherein said probe parameter comprises probe position.

19. An apparatus according to claim 13 wherein said apparatus further comprises an actuator for moving the pin relative to the shoulder and the control system further comprises a linear encoder for sensing the actual length of the pin, and wherein said pin controller determines the difference between the actual pin length and a desired pin length and controls pin position based on said difference.

20. An apparatus according to claim 13 wherein said control system further comprises a motion controller for controlling driving of said actuator, and said actuator includes an incremental encoder for supplying an actual velocity signal to said motion controller, said motion controller further receiving said pin length signal from said incremental encoder.

* * * * *